Dec. 20, 1966  P. R. LUERTZING  3,293,024
APPARATUS FOR THE CENTRIFUGAL MOLDING
OF ARTICLES IN SPLIT MOLDS
Filed March 20, 1963  7 Sheets-Sheet 1

INVENTOR:
PAUL R. LUERTZING
BY
Howson & Howson
ATTYS.

Dec. 20, 1966  P. R. LUERTZING  3,293,024
APPARATUS FOR THE CENTRIFUGAL MOLDING
OF ARTICLES IN SPLIT MOLDS
Filed March 20, 1963  7 Sheets-Sheet 2

INVENTOR:
PAUL R. LUERTZING
BY Howson & Howson
ATTYS.

Dec. 20, 1966 P. R. LUERTZING 3,293,024
APPARATUS FOR THE CENTRIFUGAL MOLDING
OF ARTICLES IN SPLIT MOLDS
Filed March 20, 1963 7 Sheets-Sheet 3
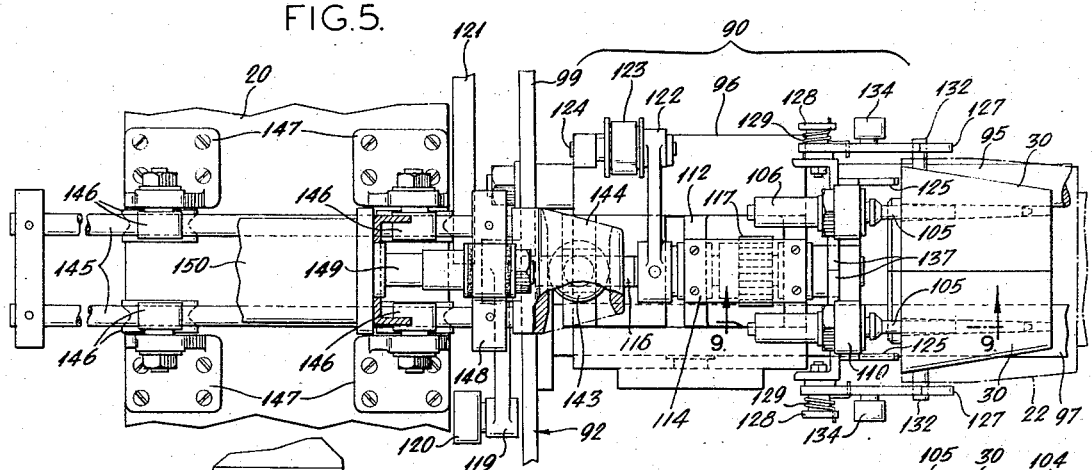
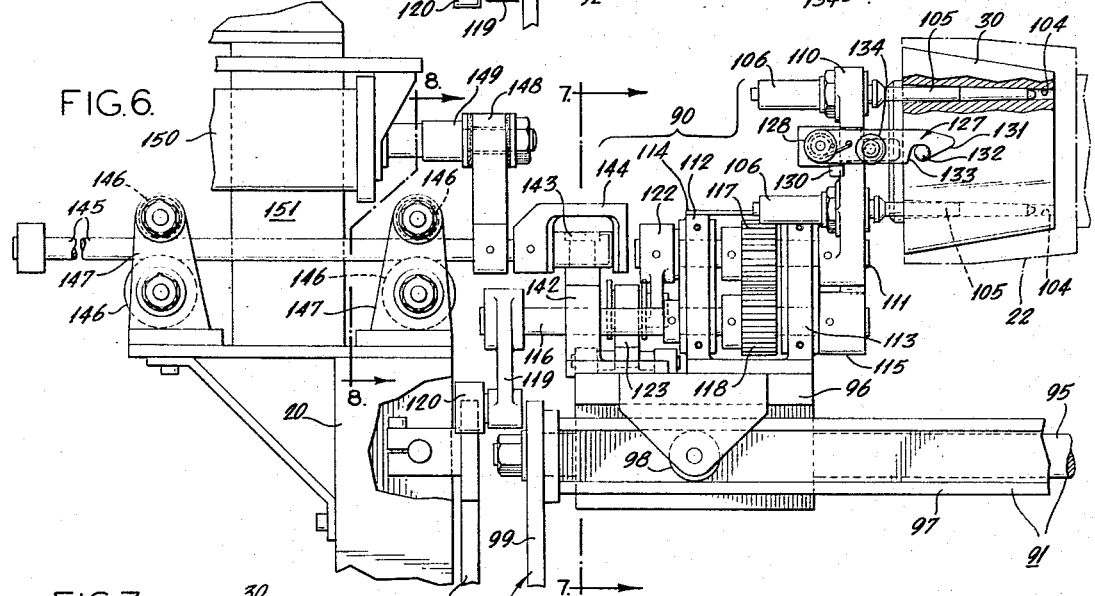
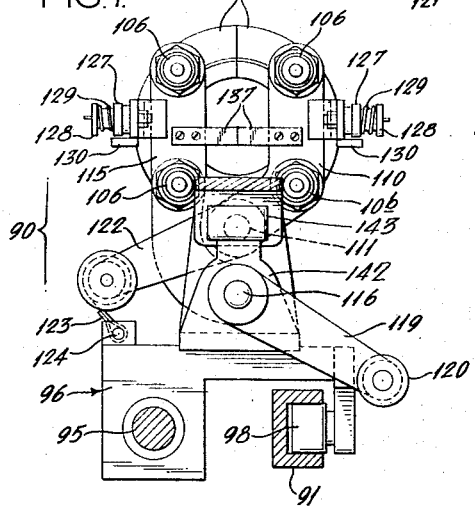
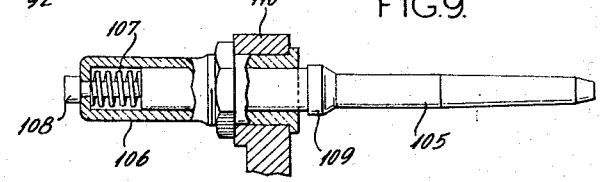
INVENTOR:
PAUL R. LUERTZING
BY Howson & Howson
ATTYS.

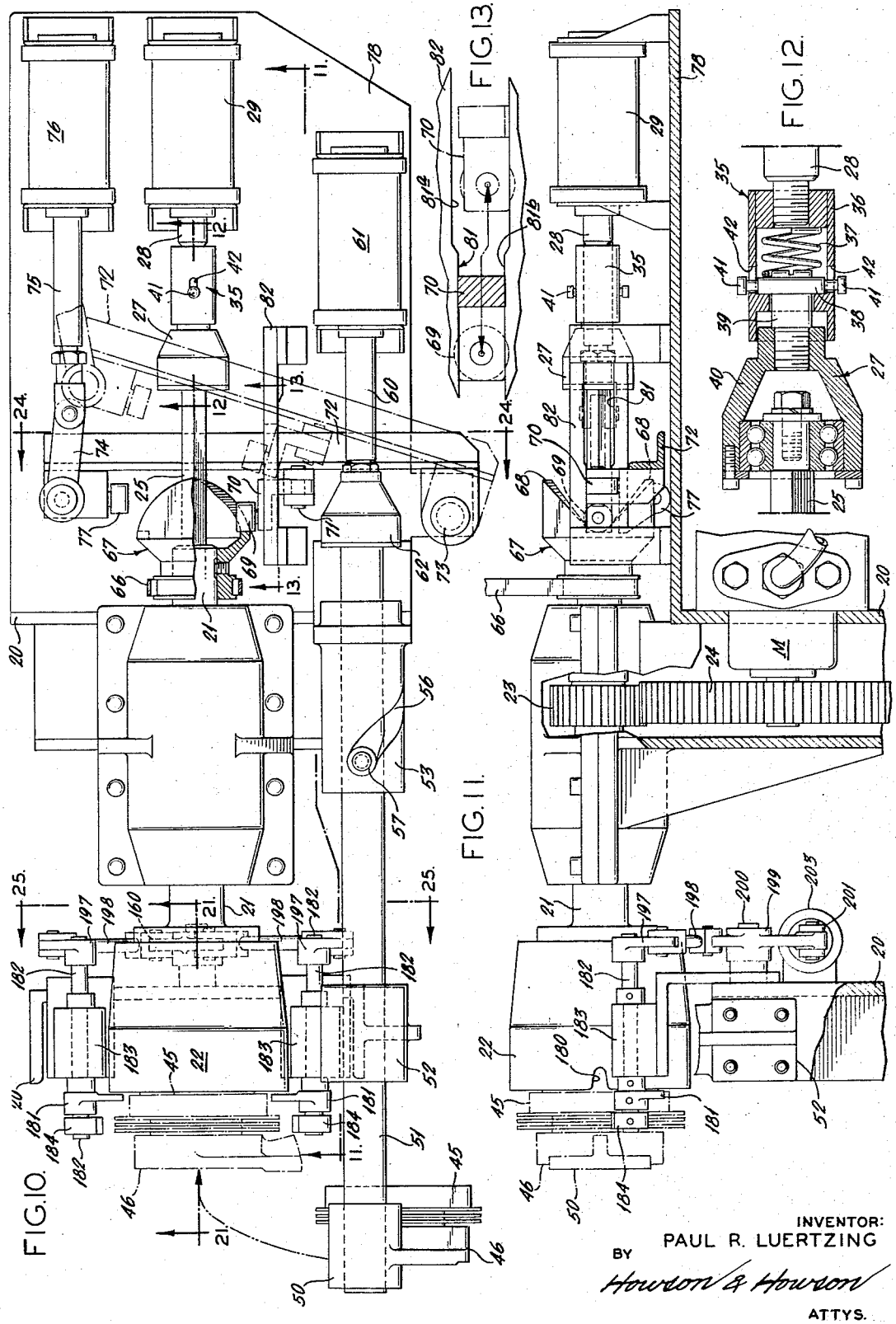

Dec. 20, 1966  P. R. LUERTZING  3,293,024
APPARATUS FOR THE CENTRIFUGAL MOLDING
OF ARTICLES IN SPLIT MOLDS
Filed March 20, 1963  7 Sheets-Sheet 5
FIG.14.
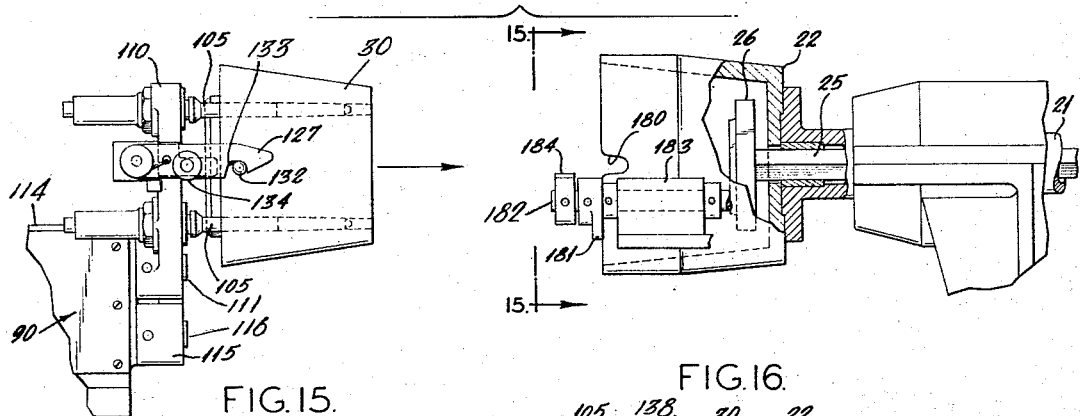
FIG.15.
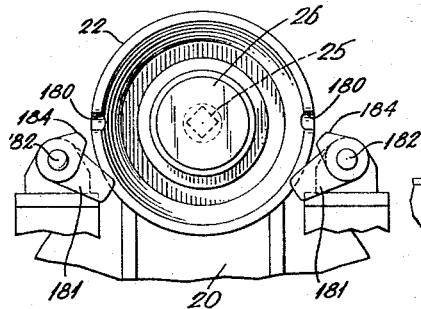
FIG.16.
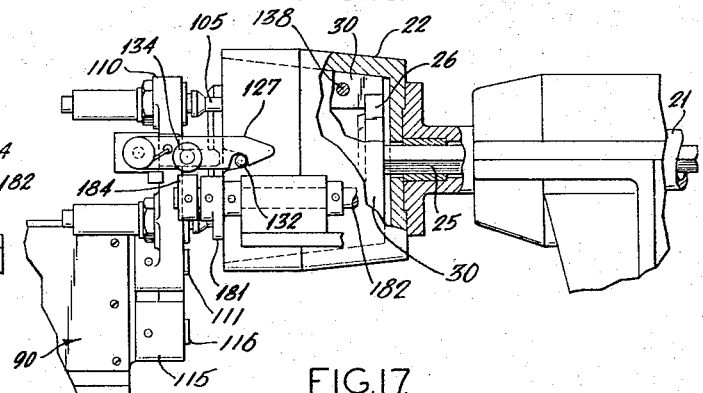
FIG.18.
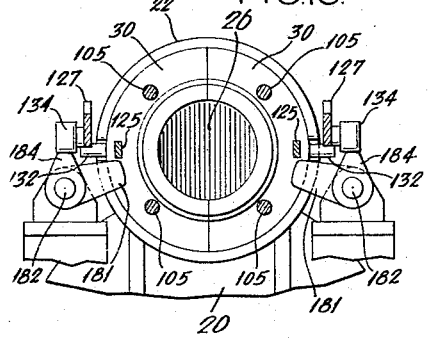
FIG.17.
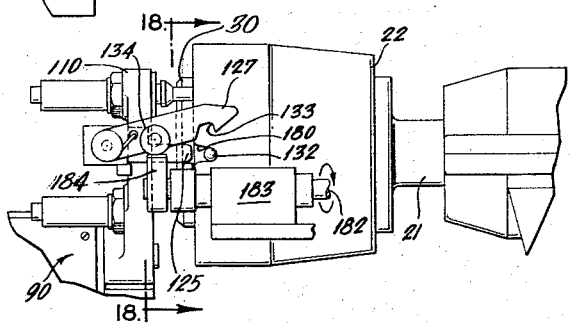
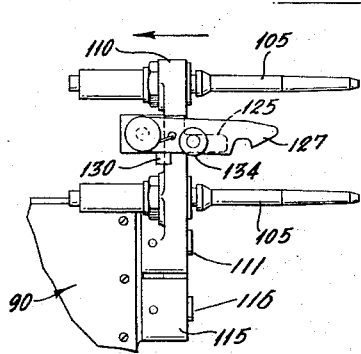
FIG.19.
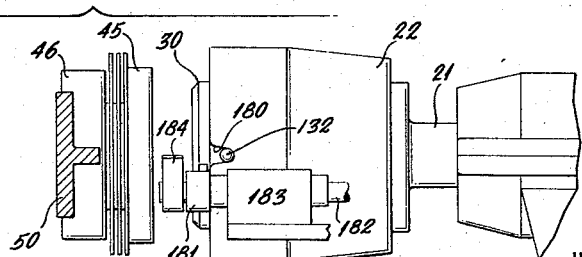
INVENTOR:
PAUL R. LUERTZING
BY
Howson & Howson
ATTYS.

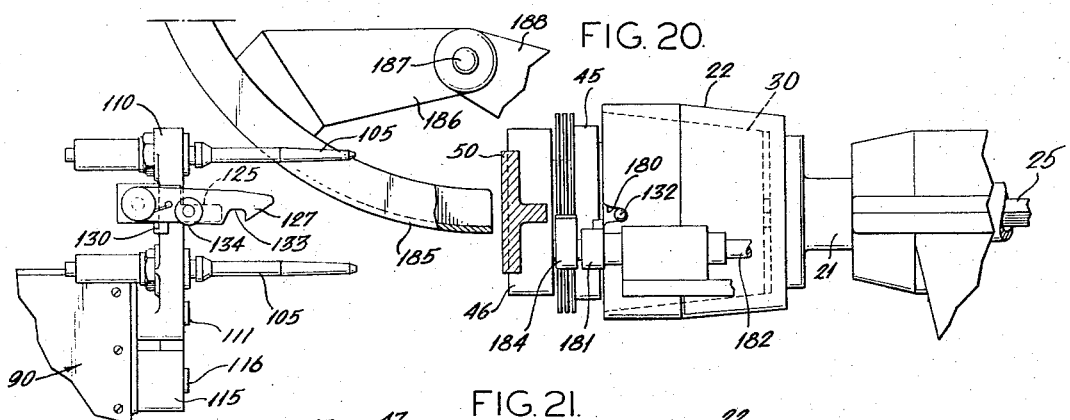
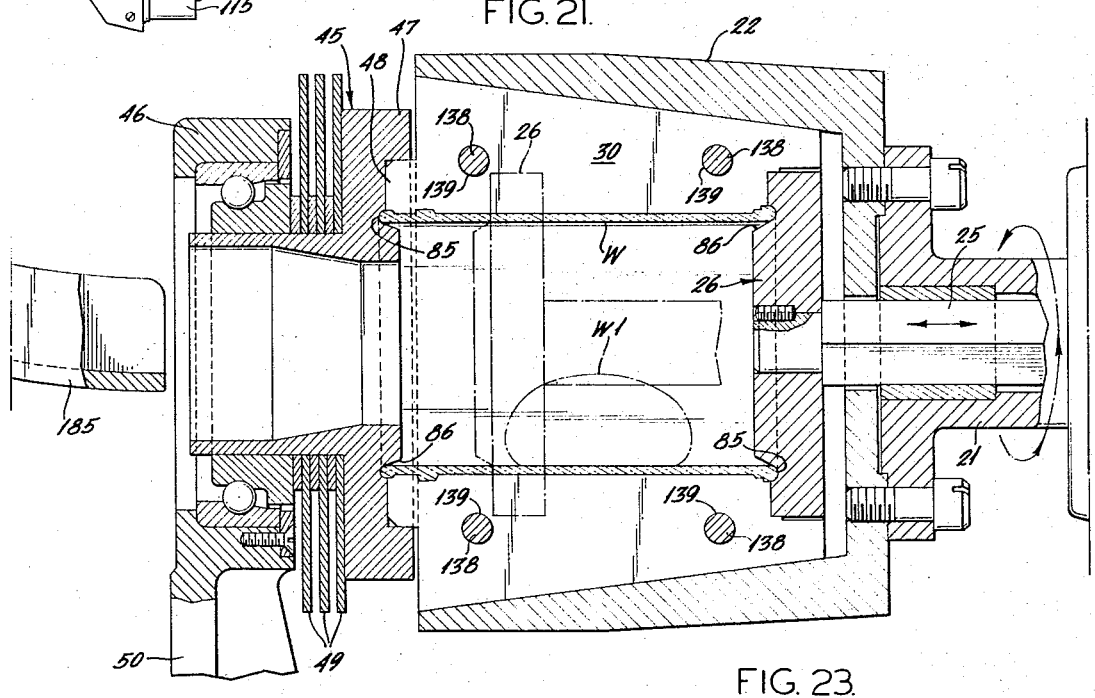
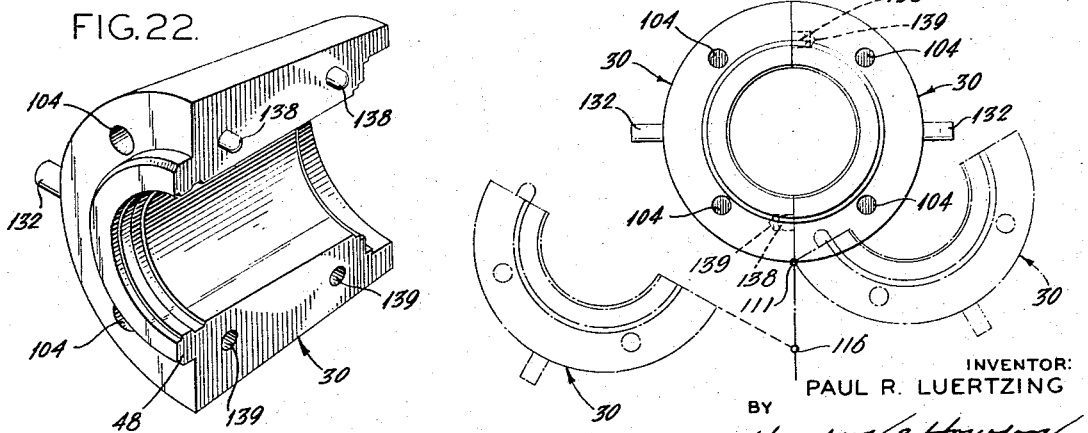

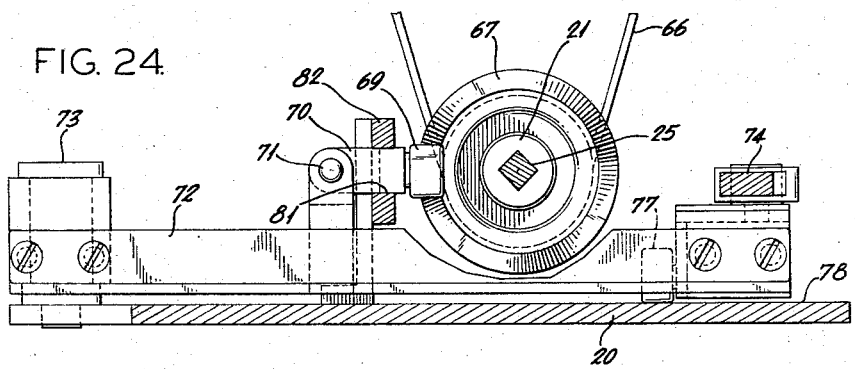

3,293,024
APPARATUS FOR THE CENTRIFUGAL MOLDING OF ARTICLES IN SPLIT MOLDS
Paul R. Luertzing, Vineland, N.J., assignor to Luertzing Corporation, Vineland, N.J., a corporation of New Jersey
Filed Mar. 20, 1963, Ser. No. 266,528
24 Claims. (Cl. 65—302)

This invention relates to centrifugal molding or casting of annular cylindrical bodies, especially of glass and has for an object the provision of improvements in this art.

One of the objects of the invention is the provision of improved apparatus and method for forming articles by exclusive or truly centrifugal molding or casting from a charge of flowable settable material, especially molten glass, requiring no parison or blank, and without the need of tools, air pressure, vacuum or other auxiliary means.

In my prior Patent No. 2,350,052 the method of molding exclusively by centrifugal means is disclosed along with means for effecting the method. The present invention is an improvement on this method and apparatus.

Another object is to provide apparatus and method for readily inserting a charge of material into a mold.

Another object is to provide means for removing the formed and set article from the mold.

Another object is to provide a divided mold body which is secured for use in a closed position in a rotary casing or spinning head to receive a charge of material; then immediately accelerated to very high speed to form the article from the material; thereafter decelerated very rapidly to a stop; and finally, after a cooling period, opened to remove the article.

Another object is to provide means for handling the mold body during a cooling period, an article delivery stage, and a return stage ready for transfer into the spinning head or casing.

The molding unit includes a mold body divided lengthwise into two half sections forming the main body of the article; a front cap having an opening through which material is charged into the mold body, the inner surface of the cap forming one end-finish of the article; a rear plate which closes the inner end of the mold body, the inner surface thereof forming the other end-finish of the article; and a casing or holder which, in conjunction with the front cap and rear plate, houses the mold body in its spinning position, the front cap and rear plate clamping the mold body so tightly that no flash appears on the finished article.

A movable chute is provided for charging material into the closed mold through the opening in the front cap after the mold parts have all been fully assembled.

Means are provided for instantaneous and rapid acceleration of the charged molding unit to form the article.

The rapid acceleration to very high speed is accomplished by a unique speed increaser driven by a hydraulic fluid motor, this motor also acting to decelerate abruptly by suitable valve control means controlled by various electrical devices.

A mold positioning device is provided, consisting of a multi-lobed end cam and a roller operated to index or position the molding unit, at the same time locking the spinning unit which comprises the spinning shaft and the molding unit or spinning head carried thereby.

A main carrier or transfer mechanism which supports a plurality of mold carrier units or carriages (five here), is mounted to turn on a horizontal axis in steps from station to station.

Means are provided to index the rotary carrier by moving it in steps from station to station and to maintain or lock it at each station stop.

Means are provided for inserting mold bodies into the casing or spinning head, said means also providing for removal or retraction thereof.

Means are provided for locking the mold body, that is any assembly of any two half sections, in the casing, also for unlocking the same.

Means are provided for holding the carriages carrying mold bodies in a neutral (non-molding) or retracted position on the rotary carrier during movement of the carrier in steps about its axis.

Means are provided for opening the divided mold bodies to remove the article, this means also closing the mold parts or sections together when moved to the transfer station, suitable means also being provided for moving the delivered article away from the apparatus.

Means are provided for locking the mold body in the rotary casing to hold it after insertion therein until the outer end cap is brought up against the mold body to hold it during rotation, the same locking means holding the mold body in the casing until after the end cap has been removed and the mold body engaged by coupling and supporting means on a transfer carriage.

Means are also provided for locking the mold parts on the transfer carriage.

The invention will be better understood from the following description of an exemplary embodiment, reference being made to the accompanying drawings, wherein:

FIG. 3 is a partial transverse elevation showing a carrier indexing mechanism, the view being taken on the line 3—3 of FIG. 1;

FIG. 4 is a partial end elevation taken on the line 4—4 of FIG. 1;

FIG. 5 is a partial enlarged top plan view, partly in section, showing the mold body transfer mechanism;

FIG. 6 is a side elevation of the mechanism shown in FIG. 5;

FIG. 7 is a transverse section and elevation taken on the line 7—7 of FIG. 6;

FIG. 8 is a partial transverse section and elevation taken on the line 8—8 of FIG. 6;

FIG. 9 is a partial enlarged longitudinal section taken on the line 9—9 of FIG. 5;

FIG. 10 is an enlarged partial top plan view taken on the line 10—10 of FIG. 10;

FIG. 11 is a vertical section and elevation taken on the line 11—11 of FIG. 10;

FIG. 12 is an enlarged partial vertical section taken on the line 12—12 of FIG. 10;

FIG. 13 is a partial enlarged vertical section and elevation taken on the line 13—13 of FIG. 10;

FIG. 14 is an enlarged partial side elevation, partially in section, showing parts seen in the middle top part of FIG. 1;

FIG. 15 is a transverse elevation taken on the line 15—15 of FIG. 14;

FIG. 16 is a view like FIG. 14 but with the mold body positioned within the casing or holder;

FIG. 17 is a view like FIG. 14 but showing the mold body being separated from the transfer mechanism and being secured in the casing;

FIG. 18 is a transverse section and elevation taken on the line 18—18 of FIG. 17;

FIG. 19 is a view like FIG. 14 but with the mold body disposed in the casing and the transfer mechanism retracted;

FIG. 20 is a view like FIG. 14 but with the mold body fully secured in the casing and a charging chute brought into position to charge material into the mold;

FIG. 21 is an enlarged section through the casing and mold body showing an article formed in the mold, the view being taken on the line 21—21 of FIG. 10;

FIG. 22 is a perspective view of a half part of a mold body;

FIG. 23 is an end elevation of a mold body as it would be supported on the carrier, the solid line position showing the mold body in closed position and the broken line position showing the mold body in open position;

FIG. 24 is an enlarged tranverse section taken on the line 24—24 of FIG. 10, showing the spinner unit positioning mechanism;

FIG. 25 is an enlarged transverse section taken on the line 25—25 of FIG. 10;

FIG. 26 is an operating diagram.

Figure 1:
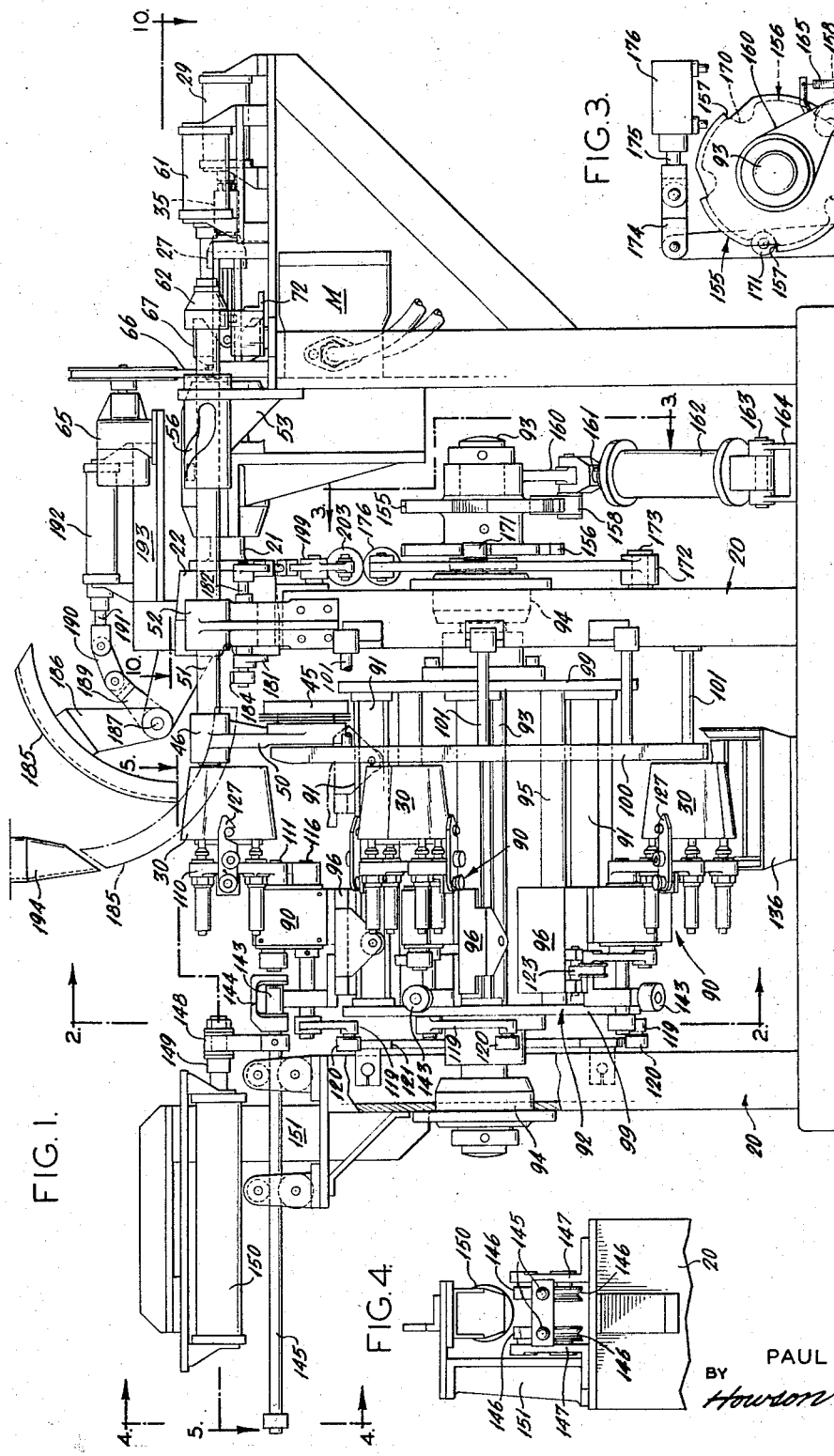
FIG. 1 is a side elevation, partly in section, of apparatus embodying the invention.

Without intention of limiting the scope of the invention, a general description of the specific form of the invention which is illustrated will be given as a guide to the detailed description which follows.

First of all, there is an axially divided mold body, shown here as comprising two parts, with a tapered outer surface which is operatively disposed in a high speed spinning head, casing, or holder. The mold body is movable axially into the casing. In its inner position the mold body is fully closed for operation and in its outer position it can be opened for removal of the formed article. In the present example the mold body is removed to a distance away from the casing before it is opened and is closed before it is brought back to the casing. The axial position of the mold body in the casing may vary somewhat due to varying working temperatures which change radial sizes and provision is made for operatively clamping the mold body in different axial operative positions.

When the mold body is inserted, the casing is stationary but since the engaging surfaces of mold body and casing are tapered and since the mold-engaging elements of the transfer mechanism exert some frictional pull in withdrawing, lock or latch means are provided for retaining the mold body in the casing.

After the transfer mechanism has withdrawn, the mold body is engaged on the outer end by a rotary mold part in the form of a front end cap carried by a shifting support which first moves transversely of the axis of rotation and then moves longitudinally along the axis to clamp the mold body in the casing. The front end cap is later released by opposite action, first an axial withdrawal, then a trans-axial swinging movement thereby unclamping the mold body. The end cap exerts great axial pressure during molding to prevent axially outward movement of the mold body along the conical holder surfaces at the very high rotative speed—which may be as high as 10,000 r.p.m. or more.

After the end cap has clamped the mold body in the casing an inner mold part in the form of an end plate is brought up tightly against the inner end of the mold body but with less force than is exerted by the outer end cap.

The outer rotary end cap is annular to leave a large central axial opening for charging material. When the mold body and its auxiliary holding parts—end cap and inner end plate—have been fully assembled a charging chute is brought into position and a charge of flowable settable material is fed through the end opening into the mold. In the preferred use of the apparatus, namely for making glass cylinders open at both ends, the charge which is introduced is a gob of molten glass, the gob preferably being in an initially elongated shape.

After being charged, the casing with the mold body tightly clamped therein is very rapidly brought up to very high speed to mold the article. The mold may provide for external projections and recessed portions; but, due to the extremely high speed, the interior surface will be almost truly cylindrical both circumferentially and axially.

One means for rapidly attaining the necessary high speed is a hydraulic motor served by a pump and a high pressure accumulator. This also serves as a high speed decelerating system as well since by merely turning the supply valve the liquid is diverted to tank and the liquid cut off in the motor causes it to act as a pump and produces its immediate stoppage.

The mold needs to be fully halted and in a predetermined position before the mold body can be removed. Actually there are two positions at one hundred and eighty degrees apart which will serve.

A zero speed switch driven with the shaft of the casing assures full stoppage before other parts can act.

Then a shaft positioning mechanism comes into action to bring the shaft to one of the two circumferential positions where the mold body can be engaged for removal.

First, the outer rotary mold part or end cap is removed by an axial movement followed by an outswinging movement. The inner axially movable mold part or end plate can then push the mold body out against the latches. These latches do not rotate with the mold but remain standing above an annular end part of the mold body which extends out radially beyond the rotary clamping part of the mold body.

An axially movable mold body transfer carriage now moves to the mold body. It has a pair of spaced pins for each half of the mold body and these pins are pushed into holds in the mold body parts. It also has latches which engage over radial pins carried by the mold body parts. Means are provided for causing automatic operation of the carriage latches to cause them to engage the mold body pins when the mold is to be removed and to release the pins when the mold body is to remain in the rotary casing. The safety latches associated with the rotary casing aid in the operation of the carriage latches, as will be described. It may here be noted that these radial pins engage in notches in the casing when the mold body is secured therein to secure positive rotation of the mold body with the casing during the high speed molding action.

After the mold body has been properly engaged by the transfer carriage the safety latches at the rotary casing are moved clear of the mold body and it is moved back with the carriage to an neutral position on a rotary carrier or carrier wheel. The rotary carrier supports a number of carriages for axial movement thereon and each carriage conveys a mold body.

The mold body supporting means for each mold body on the carriage has a separate part for each mold body part and these holder parts are hinged so as to be opened to discharge the formed article at a given position and to close again when the carriage with the mold body moves back toward the transfer station in line with the rotary casing.

At the transfer station a carriage with its mold body is moved over by mechanism located at this station and the mold body deposited in the casing as described. The carriage is then withdrawn to an inactive or neutral position but remains at the transfer station to remove to mold body after an article has been formed therein. Each carriage always serves its own mold body, although all mold bodies are alike and can be associated with any of the carriages.

An advantage of having a number of carriages on the rotary carrier is that the travel around the carrier provides time for the article to set or harden before the mold body is opened to discharge the article. The article is formed so rapidly that it is helpful to leave it in the mold body for a time to assure that it will hold its shape when discharged. After the article has been discharged the open mold parts may be sprayed or cooled or heated, as may be desirable, before they are closed and returned to the transfer station.

This provides an understanding of the major elements and functions of the apparatus. Details will be described as the disclosure proceeds.

Specifically, there is a main frame which is generally designated by the numeral 20. The frame is made quite strong to withstand the forces involved for while the spinning parts are very carefully balanced the extremely high rotational speeds must be accommodated.

The frame provides aligned bearings for a rotary spinning shaft 21 carrying on one end the frusto-conical spinning head, mold holder, or casing 22. As shown in FIGS. 1 and 11, the shaft 21 is driven through gears 23, 24 by a hydraulic motor M.

A splined shaft 25, here square, extends through the shaft 21 and, as shown in FIG. 21, carries on one end an inner clamping mold part or rear end plate 26 which engages one end of the divided mold body 30 and forms part of the mold cavity, specifically one end-finished part for the article.

The other end of the splined shaft 25 (FIG. 10) is carried rotatably in a coupling 27 secured to a piston rod 28 of a fluid cylinder device 29, a coupling 35 being provided to accommodate limited axial movement against spring pressure. FIG. 12 shows this detail where a sleeve 36 carried by the piston rod 28 houses a spring 37 acting against a collar 38 carried by a screw 39 secured to the bearing coupling sleeve 40. Radial pins 41 extend through axial slots 42 of the sleeve 36.

As shown in FIG. 21, the outer end of the mold 30 is engaged by an annular rotary clamping mold part or end cap 45 mounted in bearings in a carrier 46. The end cap 45 has an annular axial rib 47 which embraces an annular projection 48 formed on the two parts of the mold body 30 to resist their separation at high speed rotation. The rotary end cap 45 has cooling flanges or disks 49.

The carrier 46 (FIG. 10) is formed integrally with a swinging arm 50 secured on a rotary sliding shaft 51 mounted in bearings 52, 53. The bearing 53 is provided with a slot 56 and the shaft 51 is provided with a pin-carried roller 57 operating in this slot so that when the shaft is moved axially the pin and slot arrangement causes the arm 50 to swing and move axially in proper sequence to serve the rotary end cap 45, as explained.

Part of the slot shape is shown in FIG. 1. The forward portion is helical and the rear portion is straight so that as the shaft 51 is moved toward the rear, as by the piston rod 60 of a double-acting cylinder 61, the arm 50 with the rotary end cap 45 is first swung over and backward until the rotary end cap is aligned with the spinner head or casing shaft axis and then the rotary end cap is pulled straight back along the axis to clamp the mold body in the spinner head or casing with great force. A rotary coupling 62 is provided between the shaft 51 and the piston rod 60. A weight may be provided on the shaft 51 to stably hold it at the ends of its rotated positions but this has been omitted from the drawings for clarity.

Means are provided for assuring that the spinner head shaft 21 has come to a dead stop before subsequent actions can be started. The means here provided (FIG. 1) comprises a zero speed switch device 65 driven from the shaft 21, as by pulleys and a belt 66. The zero speed switch device is a market item, assumed to depend on the position of rotary centrifugal means to operate the switch, and its action will be understood without further description.

Means are provided for bringing the shaft 21 to either of two exact predetermined circumferential positions after it has come to rest after rotation. As shown in FIGS. 10, 11, 13 and 24, the shaft 21 has rigidly secured on its rear end a sleeve 67 having two axially extending cam lobes 68 adapted to be engaged by a roller 69 carried on an arm 70 which is pivoted by a pin 71 to a swinging lever 72 which is mounted on a fixed vertical pivot 73. The outer end of the lever 72 is connected by a link 74 and suitable pivot pins to the piston rod 75 of a fluid power cylinder 76. A roller 77 supports the outer end of the arm 72 for guided reaction upon a frame plate 78.

The roller 69 engages one of the four cam surfaces of the lobes 68—it does not matter which—and moves axially to turn the sleeve and shaft until the roller is positioned in the valley between lobes and there it holds the shaft firmly against rotation until a mold body has been inserted or removed.

Means are provided to turn the shaft 21 from any position in which it may stop; except, of course if it should happen to stop exactly in one of the correct predetermined positions, in which case no turning movement would be necessary. As shown in FIGS. 10, 11, 13 and 24, the swinging arm 70 which carries the roller 69 passes through a slot 81 of a fixed upstanding plate 82. The slot 81 has an enlarged part 81a (FIG. 13) which provides free movement of the arm 70 when the roller 69 first engages a lobe 68. If the roller 69 should engage on the tip of a lobe this enlarged slot portion will allow the roller to shift along the lobe—the direction being immaterial—until it engages a sloping cam surface where it can cause shaft rotation. As the roller completes its movement down the cam surface the arm 70 will move into a narrow portion 81b of the slot which will cause the roller to hold the shaft firmly in the fixed position.

As shown in FIG. 21, the end plate 26 and the front cap 45 have each a groove 85 which shapes the end-finish of the cylindrical molded article W and an interiorly projecting portion 86 which restrains inward flow of material at the ends. The charge or gob W1 is shown in broken lines.

Figure 2:
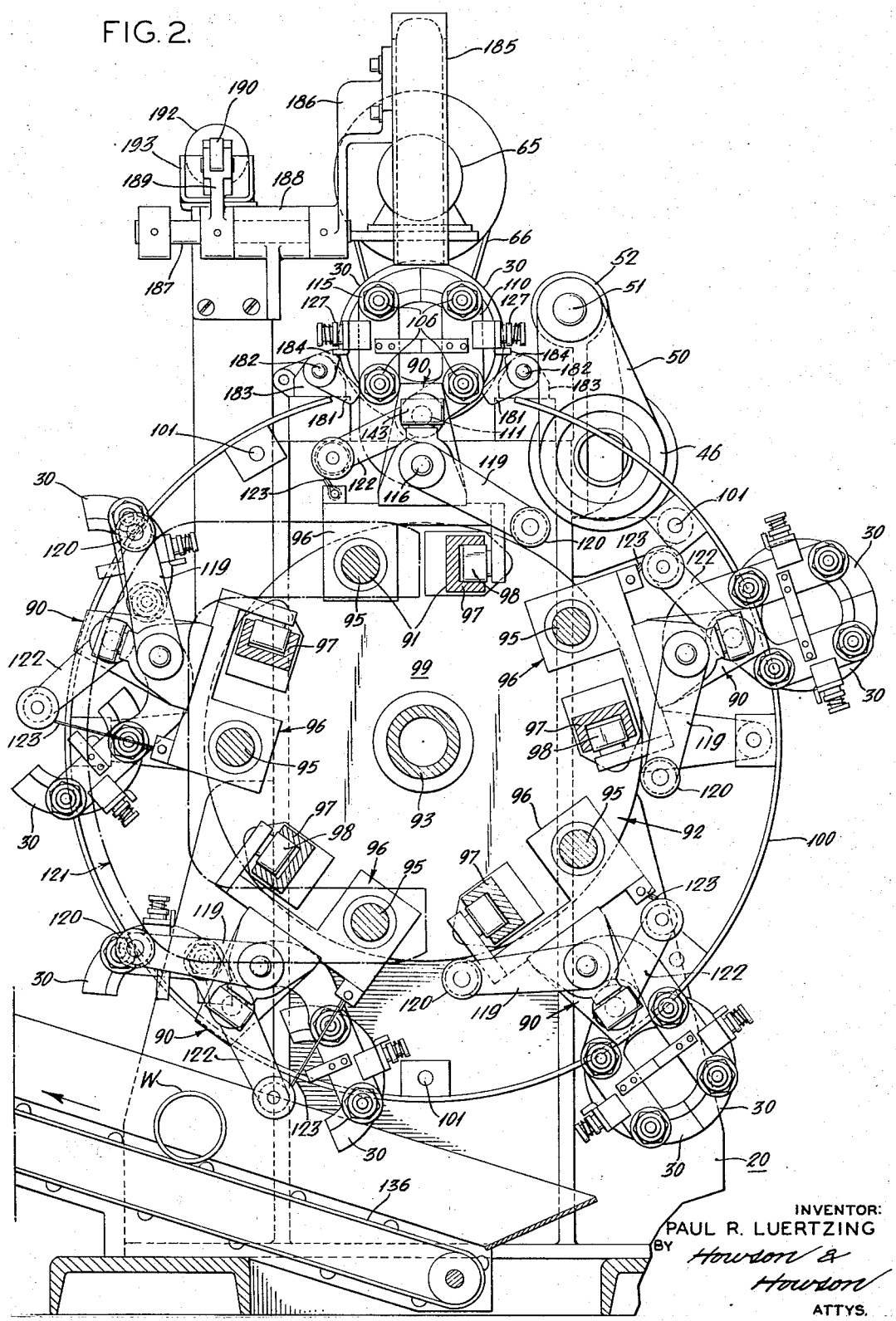
FIG. 2 is an enlarged transverse section and elevation taken on the line 2—2 of FIG. 1.

As shown in FIG. 1, each mold body 30 is carried by a carriage 90 mounted on a trackway 91 of a rotary carrier 92 having a support shaft 93 mounted in bearings 94 carried by the main frame. As shown in FIG. 2, each trackway 91 comprises a rod 95 along which the base 96 of the carriage slides and a channel bar 97 in which a pin-carried roller 98 of the carriage moves. The long guide bore in the base 96 forms the main guide and the roller 98, by extending less than full depth in the channel bar groove, provides for free movement even if the width of rod and channel bar spacing should vary.

The rails, i.e. rod 95 and bar 97, which form the trackway 91, are mounted on plates 99 carried by the shaft 93 of the carrier.

Except at the transfer position at the top, the carriages are held in a rear position on the carrier by a fixed curve guard rail or guide ring 100 supported on the frame by posts 101.

As shown in FIGS. 5, 6, 7, 9, and 19, the parts of a mold body 30 are each provided with two axial holes or bores 104 into which tapered pins 105 are inserted for supporting the mold body parts. Each pin is mounted for limited axial movement in a sleeve 106 carrying a spring 107 which is positioned between the rear end of the pin and a head end of the sleeve. A screw 108 threaded into the end of the pin and passing out a hole in the head of the sleeve holds the pin in the sleeve. A shoulder 109 on the pin limits its rearward movement. The pins are tapered for a distance from the end to enter different depths into their holes, depending on temperatures.

Two pins 105 mounted in sleeves 106 for one half part of a mold body are carried by a support arm 110 mounted on an axially extending shaft 111 rotatably supported in bearings in axially spaced brackets 112 and 113 of a carriage 90. At the top the brackets are connected by a cover plate 114.

Another pair of pins 105 and their sleeves 106 are mounted on a companion arm 115 mounted on a parallel axially extending shaft 116 rotatably supported in bearings in the brackets 112 and 113.

The shafts 111 and 116 are caused to turn in unison by intermeshing gears 117 and 118 carried by these shafts respectively. The lower shaft 116 at its rear end has secured thereon an operating cam arm 119 which at its end carries a pin-mounted cam follower roller 120 which is operated by passage along the outer peripheral surface of a fixed cam 121. The upper shaft 111 at its rear end has secured thereon a biasing arm 122 which at its outer end is connected to a helical coil spring 123 connected to a fixed anchor pin 124 on the carriage to urge the arm to move in a direction tending to keep the mold parts together.

Stop abutments 125, secured to the arms 110, 115, are adapted to engage the rear end of the mold body parts to prevent jamming of the pins 105 in the holes of the mold body parts.

Each arm 110 and 115 on its outer side carries a mold part coupling or entraining latch 127 mounted on a pivot pin 128, the latch being urged downward by a torsion spring 129 and limited in its downward movement by a stop element 130. The latch has a tapered front end portion 131 adapted to ride over an operating element and a laterally projecting pin 132 of a mold body part, and also has a notch 133 adapted to embrace the mold body pin 132 to hold the mold body part in position on the pins 105. Intermediate its length the latch is provided with a pin-mounted cam follower roller 134. The operation of these latches will be explained presently. Thus, the arm 110 and its associated pins 105 and latch 127 serves as a holder or support for one mold body part 30 and the arm 115 and its associated pins 105 and latch 125 serves as a holder or support for the other mold body part 30.

As shown in broken lines in FIG. 2, the cam 121 on which the followers 120 of arms 119 move, is so formed that the mold body parts are opened as they reach a position above the conveyor belt 136 to discharge the molded article W upon the conveyor belt 136 which takes it away. Thereafter in continued upward clockwise movement, the mold body parts are held open for a distance to permit spraying, cooling, heating or other desired treatment; and are closed again before reaching the transfer station at the top. As set forth previously, the coil springs 123 normally urge the mold parts together and the mold parts are closed prior to reaching their uppermost position on the carriage.

The arms 110 and 115 are provided with interengaging stop elements 137 to limit their closing movement and hold them and their pins 105 in proper mold-engaging position when the arms are not carrying mold body parts, that is, while the mold body is in the spinning head or casing.

Because of the unequal lengths of the arms 110 and 115 and their geared connection, they describe non-symmetrical movements as they open and close. This is shown in FIGS. 7 and 23. The mold body parts always close together accurately, however. To assure perfect registration when closed, the mold body parts are provided with taper-end dowel pins 138 which enter holes 139 of the mating part.

Means are provided for moving the carriages forward and back at the mold transfer station, such means, as shown in FIGS. 1, 4, 6 and 8, comprising an upstanding element 142 carried by a carriage 90 and having a pin supported roller 143 on its end. As the roller 143 comes into the transfer position by rotation of the carrier wheel it enters between axially spaced elements of a yoke member 144 secured to the front end of guide rods 145 mounted to move between spaced guide rollers 146 of fixed upstanding guide brackets 147. At the front end behind the yoke 144 the guide rods 145 carry an upstanding plate 148 to which is connected the front end of a piston rod 149 of a power cylinder 150 rigidly mounted on main frame supports 151.

It will be clear that as each carriage arrives at the transfer station it becomes coupled with the power transfer mechanism and becomes disconnected therefrom as soon as it leaves the transfer station.

Means are provided for indexing the carrier wheel around in steps as required to bring carriages with mold body parts to and away from the transfer station. As shown in FIGS. 1 and 3, the carrier wheel shaft 93 is provided with a ratchet disk 155 and a holding disk 156.

The ratchet disk 155 has ratchet notches 157 which are engaged by a ratchet pawl 158 pivoted by a pin 159 which also forms a pivot connection between an arm 160 turnably mounted on the shaft 93 and the outer end of a piston rod 161 of a fluid power cylinder 162. The cylinder 162 at its outer end is mounted on a pivot pin 163 of a fixed frame bracket 164. The pawl 158 is urged into engaging position by a spring 165.

The holding disk 156 has a number of notches 170 adapted to be engaged by a pin-borne roller 171 of an arm 172 mounted on a fixed pivot pin 173. The outer end of the arm 172 is connected by a link 174 and suitable pivot pins to the end of a power piston 175 of a fluid operating cylinder 176 fixedly mounted on the frame.

Since the number of ratchet notches and holding notches is the same and since they have corresponding correlated locations, it will be clear that by properly timed operation of the power devices 162 and 176 the carriage-carrying wheel will be moved and held as required.

The additional mechanism and procedure connected with the transfer of a mold body into and out of the spinner head casing 22 can now be explained by reference to FIGS. 14–21.

FIG. 14 shows a closed mold body, with its halves held on the pins 105, being moved on a carriage 90 toward the spinning head casing 22. The mold body parts are held tightly together by the biasing arm 122 and spring 123 which are a part of and travel with each carriage assembly. The latches 127 engage the mold body pins 132 to hold the mold body parts securely on the carriage. Inside the spinner head casing 22 the rear auxiliary mold end part or end plate 26 occupies a forward position, being pushed forward by spring 37 (FIG. 12). There are notches 180 in the spinner head casing shell 22 into which the pins 132 of the mold body parts enter when the bold body parts are pushed into position, as shown in FIG. 16, to assure positive rotation together.

On the sides of the spinner head casing but not carried by it (see also FIG. 25), there are mounted mold body retaining safety latches 181. Shafts 182 carried in fixed bearing mounts 183 turnably support the latches 181 for turning movement in opposite directions to swing up to engage behind the unobstructed outer edge part of the mold body or to swing down clear of it.

The shafts 182 also carry latch release cam arms 184 adapted, when turned up, to engage the cam rollers 134 on the sides of the latches 127 and lift the latches against their springs to release them from the mold body pins 132. This phase of action is shown in FIGS. 17 and 18.

As shown in FIG. 19, the carriage 90 with its pins 105 and latches 127 now withdraws. It is still connected by the slotted yoke 144 with the reciprocating piston 149 of the power cylinder 150. Also as shown in FIG. 19, the outer rotary auxiliary mold part or end cap 45 swings up axially with the spinner head casing shaft after the carriage has withdrawn.

FIGS. 20 and 21 show the mold body parts in final assembled condition, the outer auxiliary mold body part or end cap 45 being moved back axially to strongly clamp the mold body in the spinner head casing and the inner auxiliary mold part or plate 26 having been pressed forward by the spring 37 and coupling 35.

After mold assembly is complete, a curved charging chute 185 is brought down into position to feed a slug or gob of molten glass (W1 in FIG. 21) into the still stationary mold held in the spinning head casing. As shown in FIGS. 1 and 2, the chute 185 is mounted on an arm 186 carried by a shaft 187 turnable in a fixed bearing support 188. An operating arm 189 carried by the shaft 187 is connected by a link 190 and suitable pivot pins with the end of a piston rod 191 of a power cylinder 192 carried by a fixed frame mounting 193. Slugs or gobs of material are supplied at regular intervals by the spout 194 from a suitable source and means, not shown, are provided to divert the slugs or gobs for remelting if the machine is not ready to take them.

The means for operating the safety latch shafts 182 together is shown in FIG. 25. The shafts 182 have arms 197 connected by links 198 and suitable pivot pins to a bell crank lever 199 mounted on a shaft 200. The lever 199 is connected by a link 201 and suitable pivot pins to the end of a piston rod 202 of a power operating cylinder 203 supported on the main frame.

After the slug or gob of material has been charged into the mold, the shaft-holding roller 69 having been previously withdrawn clear of the shaft sleeve 67, power fluid is supplied to the motor M to bring it very rapidly—almost with explosive speed due to high pressure fluid and the accumulator—to very high speed. This speed will vary with different sizes of article, different kinds of material and other factors but, as one example, may be in the range of 10,000 r.p.m. The turning time need be only very brief, say 1½ to 2 seconds, after which, by shifting fluid to exhaust, the speed is rapidly decelerated, the spinning being halted in about ¼ to ½ second. Suitable timing controls are provided.

The zero speed switch device assures a complete stop of the spinning head, after which the shaft-positioning roller 69 re-enters a notch of the sleeve 67 to bring the shaft 21 with the spinning head and mold into one of the two predetermined positions where the mold body parts can be engaged by the transfer carriage pins 105.

The outer auxiliary mold part or end cap 45 is then backed off and turned down out of the way, the latches 181 being retained in position behind the mold body, and the carriage 90 is moved over to engage its pins 105 with the mold body parts. The safety latches 181 are then turned down to allow the coupling latches 127 to move down by spring action. If the latches do not immediately engage the pins 132 they will do so as soon as the inner auxiliary mold part or plate 26 pushes the mold body out of the spinner head casing (FIG. 21), the inclined nose portions 131 of the coupling latches insuring this action. As soon as the mold body push-out action has been completed the power device 29 of the end plate 26 is de-energized and the piston of the power device therefor is moved to its retracted position.

Operation of the apparatus has been described above in connection with the various sub-assemblies, so that the operation of the complete apparatus will be clear without further explanations except that by reference to FIG. 26 the cycle of operations for the formation of one article can be readily followed. It will be understood that while the various operating parts can be put through their co-ordinated movements by manual control, the actual machine will be fully equipped with timing means and movement control interlocking means, such as limit switches, relays and the like. It is not necessary to illustrate and describe such means since the coordinated movements can be fully understood from the illustration and the foregoing description.

It is thus seen that the invention provides very effective improved means and method for the molding of cylindrical articles by centrifugal action alone without air pressure or forming tools.

This method and means of forming an article, especially an open-ended, annular cylindrical body, with the ends thereof finished in a single operation, is faster, simpler and less costly than other methods and means, for the article is cast or molded by centrifugal force in a unique molding unit.

When the molding unit is in operative position, a charge is deposited and the molding unit is instantly and rapidly spun to thus mold or cast the article.

In most other methods, especially in forming glass articles, a charge is placed in a mold, the mold capped or closed at the open end and then air pressure, vacuum or other means are employed to form a parison. This parison blank is then transferred to a finishing mold for final operation.

Another important factor is that in this machine, as one article is being molded or cast, in the molding station, other previously made articles are being cooled and others are being removed from the mold bodies. Consequently, with a main carriage having a plurality of mold bodies, one of which is in the spinning head or casing, the others are passing through various functions necessary for rapid production.

While one embodiment of the invention has been disclosed for purposes of illustration it is to be understood that there may be various embodiments and modifications within the general scope of the invention.

I claim:

1. Centrifugal molding apparatus, comprising in combination, a rotary mold holder casing for holding a mold body for centrifugally forming an annular cylindrical molded article, an axially divided mold body of a size when closed to fit in said holder casing, said mold body having outer mold surfaces with open ends for forming an annular molded article, a first auxiliary mold part having an auxiliary mold surface for forming an end-finish of the article fitting against the end of said mold body, said first auxiliary mold part being mounted for rotation with and having axial sliding movement relative to said rotary mold holder casing, a second auxiliary mold part having an auxiliary mold surface for forming an end-finish of the article fitting against the end of the mold body to clamp it in said holder, and means supporting said second auxiliary mold part for rotary movement with said mold body and for moving it against or away from said mold body, said second auxiliary mold part having a central opening through which a charge of material can be introduced when it is closed against said mold body and mold carrying means adapted to engage the mold body to move it into and out of the rotary mold holder casing.

2. Centrifugal molding apparatus as set forth in claim 1, in which said supporting means for the second auxiliary mold part is mounted for movement of the mold part axially as it approaches and leaves the split mold and for lateral movement to clear the space along the axis after it has moved clear of the mold body.

3. Centrifugal molding apparatus as set forth in claim 1, in which said first auxiliary mold part is provided with resilient means urging it forward when it is in an axially retracted position, and is also provided with power means for moving it back and forth axially.

4. Centrifugal molding apparatus, comprising in combination, a rotary mold holder casing, an axially divided mold body of a size when closed to fit in said holder casing, removable rotary mold body clamping means mounted to move against the outer end of the mold body and clamp it in said holder casing, a carriage having a holder means for engaging the mold body when closed and transfer means to move said carriage into and out of said rotary holder casing when the mold clamping means is moved clear of the mold body.

5. Centrifugal molding apparatus as set forth in claim 4, wherein said mold clamping means is mounted to swing in and out from the axis of said mold holder casing and wherein said carriage is mounted to move in and out along the axis of the rotary mold holder casing to insert a mold into and remove a mold from said rotary mold holder casing.

6. Centrifugal molding apparatus as set forth in claim 5, wherein a rotary frame is provided for rotation about an axis parallel to the axis of said rotary mold holder casing to move said carriage into and out of position on the axis of said rotary mold holder casing.

7. Centrifugal molding apparatus as claimed in claim 4 including an axially slideable inner mold plate for the inner end of said mold body mounted in and rotatable with the mold holder casing.

8. Centrifugal molding apparatus as claimed in claim 4 including a first auxiliary mold part having an auxiliary mold surface for forming an end-finish of the article fitting against the end of said mold body, said first auxiliary mold part being mounted for rotation with, and having axial sliding movement relative to said rotary mold holder casing, a second auxiliary mold part having an auxiliary mold surface for forming an end-finish of the article fitting against the end of the mold body to clamp it in said holder, and means supporting said second auxiliary mold part for rotary movement with said mold body and for moving it against or away from said mold body, said second auxiliary mold part having a central opening through which a charge of material can be introduced when it is closed against said mold body.

9. Centrifugal molding apparatus as claimed in claim 8 in which said supporting means for the second auxiliary mold part is mounted for movement of the mold part axially as it approaches and leaves the split mold and for lateral movement to clear the space along the axis after it has moved clear of the mold body.

10. Centrifugal molding apparatus as claimed in claim 8, in which said first auxiliary mold part is provided with resilient means urging it forward when it is in an axially retracted position, and is also provided with power means for moving it back and forth axially.

11. Centrifugal molding apparatus as claimed in claim 4 wherein said carriage includes means engageable with said mold body in a predetermined turned position when at rest, a shaft supporting said rotary holder casing, a positioning element on said shaft, and means engageable with said positioning element for turning the shaft when stopped into said predetermined position for engagement of the mold by said carriage.

12. Centrifugal molding apparatus as set forth in claim 11, in which said positioning element comprises a cam lobed member, and the means engageable therewith comprises a detent member carried on an axially movable member, and means forming an axial guide for said axially movable member providing free movement when the detent member first engages the cam lobed member to permit it to move away from a dead-center position, said axial guide having a shape to prevent the free movement when the detent member is fully engaged in holding position with said cam lobe member.

13. Centrifugal molding apparatus as set forth in claim 11, which further includes a zero speed switch device associated with said shaft to assure its complete stoppage before the shaft positioning means comes into action.

14. Centrifugal molding apparatus comprising in combination, a rotary mold holder casing, an axially divided mold body of a size when closed to fit in said holder casing, a carrier wheel mounted to turn on an axis parallel to the axis of said rotary holder casing, a plurality of carriages mounted for axial movement on said wheel, each carriage having a mold body part holder with means for separately engaging each part of the divided mold body, the holders on a carriage being mounted for movement to separate the mold body parts and bring them together, and reciprocating transfer means on the axis of said rotary holder for moving a carriage forward and back to insert a mold body in or remove a mold body from said rotary mold holder casing.

15. Centrifugal molding apparatus as set forth in claim 14, further characterized by the fact that each carriage on said wheel is provided with coupling means adapted to detachably engage said reciprocating transfer means.

16. Centrifugal molding apparatus as set forth in claim 14, further characterized by the fact that the mold body part holders on the carriage are mounted on parallel shafts provided with means to move them conjointly in opposite directions.

17. Centrifugal molding apparatus as set forth in claim 16, wherein first means are provided on the carriage for holding the mold body part holders and their mold parts together, and second means associated with the carrier wheel and mold body part holders for separating said mold body part holders and mold body parts carried thereby at a position other than in engagement with said transfer means as the carriages are carried around on said carrier wheel.

18. Centrifugal molding apparatus as set forth in claim 14, in which the means on a carriage for engaging a mold body part includes axial pins for engaging holes in a mold body part and coupling latches for entraining the mold part.

19. Centrifugal molding apparatus as set forth in claim 18, further characterized by the fact that said mold body parts have a lateral pin and said coupling latches have a notch to engage a lateral mold pin, and means for resiliently urging the latch into pin-engaging position.

20. Centrifugal molding apparatus as set forth in claim 18, further characterized by the fact that means are provided adjacent the rotary mold holder casing for operating said coupling latches on the carriage to connect a mold body part with a carriage or disconnect it from a carriage.

21. Centrifugal molding apparatus comprising in combination, a rotary mold holder casing, an axially divided mold body of a size when closed to fit in said holder casing, a mold body carriage movable to insert the mold body in the holder casing and remove it therefrom, said carriage having a mold body supporting element and a mold body coupling element, latch means for holding the mold in the holder casing, means operative with said latch means when moved to mold body holding position for releasing the mold body coupling element of said carriage from the mold body and operative when the latch means is moved to mold body releasing position for moving clear of the mold body coupling element to allow the mold body to be engaged thereby.

22. Centrifugal molding apparatus as set forth in claim 21, in which said latch means remains in latching position free of engagement with the mold body while it is being rotated in said holder.

23. Centrifugal molding apparatus as set forth in claim 21, which further includes a removable auxiliary rotary mold part mounted adjacent said rotary mold holder casing, and means to move said auxiliary rotary mold part laterally of said rotary mold holder casing and axially thereof into position against said mold body when in the rotary holder casing to move the mold body axially clear of said mold body latch means while the mold body and holder casing are rotating, the rotary mold part moving into and out of position at the mold holder casing when said carriage has moved clear of the mold body holder casing.

24. Centrifugal molding apparatus, comprising in combination, a centrifugal spinner shaft, a mold body holder casing mounted at a base end on said spinner shaft, said mold body holder casing being open at its outer end and having a frusto-conical shape with the large portion at the open end, an axially divided mold body insertable in and removable from said holder casing, said mold body having a frusto-conical outer surface fitting in said holder casing, an inner end plate mounted in the bottom of said holder casing and fitting against and closing the inner end of said mold body, a splined shaft supporting said end plate for axial movement in said holder casing, power means for moving said splined shaft axially, resilient means between said power means and splined shaft to urge said splined shaft and end plate forward toward the mold body, a swingable slidable end cap mount, a rotatable annular end cap supported in bearings in said mount and movable against the outer end of the mold body to rotate therewith during the centrifugal forming action and movable therefrom at other times for the axial insertion of a mold body into said holder casing, radial pins on the sides of the outer ends of the parts of said mold body parts engageable with notches on said holder casing for forcing said mold body parts to rotate positively with said holder casing, means for stopping and holding said spinner shaft and the holder casing and mold body carried thereby in a predetermined circumferential position, a movable carriage for a mold body movable toward and from said holder casing and mold body position therein, means carried by said carriage for entraining said mold body parts when in said predetermined position, a multi-position rotary carrier wheel, axial trackways on said carrier wheel supporting a plurality of carriages for axial movement thereon to move toward and away from said holder casing, power means at a transfer station for moving carriages toward and from said holder casing, said carrier wheel moving mold bodies on carriages in a number of steps from the transfer station to a plurality of cooling positions with the mold body closed and then moving them to a delivery station where the mold bodies are opened and the molded article removed, the mold bodies after delivery being closed and returned to the transfer station, a shiftable chute mounted to swing into position at the opening in the annular end cap when closed against the mold body for introducing a charge of moldable material into the closed mold, power means for operating said end cap mount to move the end cap in and out and hold it tightly against said mold body in the holder casing during molding, the power means also holding said inner end plate tightly against the inner end of the mold body during molding, and power means for rapidly accelerating said spinner shaft, holder casing and mold parts to very high speed to mold the article and then rapidly decelerate it to a stop after molding.

References Cited by the Examiner

UNITED STATES PATENTS

| | | | |
|---|---|---|---|
| 1,301,378 | 4/1919 | Bruner et al. | 65—302 |
| 1,917,872 | 7/1933 | Campbell | 65—302 X |
| 2,198,750 | 4/1940 | Winder | 65—71 |
| 2,224,488 | 12/1940 | Rendall | 65—71 X |
| 2,349,213 | 5/1944 | Van Niekerk | 264—311 |
| 2,603,836 | 7/1952 | Rempel | 18—26 |
| 2,947,489 | 8/1960 | Russell | 65—1 X |
| 2,961,703 | 11/1960 | Pinotti | 18—26 |
| 3,048,896 | 8/1962 | Marlo | 264—311 |
| 3,132,017 | 5/1964 | Coleman et al. | 65—302 X |

DONALL H. SYLVESTER, *Primary Examiner.*

ALEXANDER H. BRODMERKEL, *Examiner.*

J. R. DUNCAN, F. W. MIGA, *Assistant Examiners.*